United States Patent
Kalia et al.

(10) Patent No.: US 12,184,549 B2
(45) Date of Patent: Dec. 31, 2024

(54) DYNAMIC RE-ROUTING AND MODIFICATION OF LAYER TRAFFIC IN VIRTUALIZED RANS

(71) Applicant: Microsoft Technology Licensing, LLC, Redmond, WA (US)

(72) Inventors: Anuj Kalia, Newcastle, WA (US); Daehyeok Kim, Redmond, WA (US); Ilias Marinos, London (GB); Tao Ji, Austin, TX (US); Nikita Lazarev, Ithaca, NY (US); Paramvir Bahl, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 399 days.

(21) Appl. No.: 17/825,645

(22) Filed: May 26, 2022

(65) Prior Publication Data

US 2023/0388234 A1  Nov. 30, 2023

(51) Int. Cl.
*H04L 45/76* (2022.01)
*H04W 40/34* (2009.01)
*H04W 84/04* (2009.01)

(52) U.S. Cl.
CPC ............ *H04L 45/76* (2022.05); *H04W 40/34* (2013.01); *H04W 84/045* (2013.01)

(58) Field of Classification Search
CPC ......... H04L 45/22; H04L 45/28; H04L 45/76; H04L 49/552; H04W 40/34; H04W 84/045

See application file for complete search history.

(56) References Cited

U.S. PATENT DOCUMENTS

| | | | |
|---|---|---|---|
| 2018/0248787 A1 | 8/2018 | Rajagopal et al. | |
| 2021/0083794 A1* | 3/2021 | Agarwal | H04L 5/0048 |
| 2022/0159785 A1 | 5/2022 | Foukas et al. | |
| 2022/0386143 A1* | 12/2022 | Gunturu | H04W 52/42 |
| 2023/0362883 A1* | 11/2023 | Park | H04W 68/02 |

OTHER PUBLICATIONS

Chantre, et al., "Reliable Broadcasting in 5G NFV-Based Networks", In Journal of IEEE Communications Magazine, vol. 56, Issue 3, Mar. 1, 2018, pp. 218-224.
"International Search Report and Written Opinion Issued in PCT Application No. PCT/US23/019188", Mailed Date: Jul. 31, 2023, 13 Pages.

* cited by examiner

*Primary Examiner* — Michael K Phillips
*Assistant Examiner* — Ahmed K Jaber

(57) ABSTRACT

Methods and systems for dynamically re-routing layer traffic between different servers with little user-visible disruption and without modifications to the vRAN software stack are provided. This approach enables operators to initiate a PHY migration either on demand (e.g., during planned maintenances) or to set up automatic migration on unexpected events (e.g., server failures). It is recognized that PHY processing in cellular networks has no hard state that must be migrated. As a result, layer traffic such as the PHY-L2 traffic or L2-PHY traffic can be simply re-routed to a different server. This re-routing mechanism is realized by interposing one or more message controllers (e.g., middlebox) in a communication channel between the PHY and L2.

20 Claims, 9 Drawing Sheets

DYNAMIC RE-ROUTING AND MODIFICATION OF LAYER TRAFFIC IN VIRTUALIZED RANS

BACKGROUND

Radio access networks (RANs) are a part of the cellular network infrastructure (e.g., LTE and 5G) that converts wireless signals between user equipment and radio cell towers into data packets and vice versa. Manufacturers and providers of RANs are seeking to replace specialized RAN hardware with software systems running on commodity servers deployed in edge datacenters. This approach, called virtualized RAN (vRAN), has advantages of reduced vendor lock-ins, rapid feature development/upgrades, easier maintenance, and reduced costs. However, current vRAN deployments need to overcome challenges in high availability, servicing, energy efficiency, and/or load balancing.

Distributed unit servers, which run lower layers of a vRAN stack, are statically configured to serve a fixed set of radio units (RUs). These lower layers include the physical layer (PHY, layer-1, or L1) and layer-2 (L2, including media access control (MAC) and radio link control (RLC)). While such static configuration works well for certain scenarios (e.g., no server failures, no workload changes, etc.), there are cases where needs exist to dynamically reconfigure the RU-to-server mapping. For example, when a PHY process fails, the baseband processing workload served by the failed PHY process needs to be migrated to another server. This functionality is not available in current vRAN deployments.

Two aspects that make PHY migration challenging are real-time latency requirements and high software complexity. First, PHY processing has stringent tail latency requirements among all RAN layers by requiring baseband processing tasks to be completed within strict transmission time intervals (TTIs) that can measure as low as 500 μs in 5G's common deployment configurations. As a result, existing approaches (e.g., virtual machine migration) are inapplicable since they require between tens of milliseconds to seconds to complete the migration. Such downtime in PHY processing can cause severe user-visible disruptions. Second, production-grade vRAN software stacks are complex and often proprietary, which makes them difficult or almost impossible to modify to implement any custom migration logic.

It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY

According to the present disclosure, the above and other issues are resolved by dynamically re-routing layer traffic between different servers with little user-visible disruptions and without modifications to the vRAN software stack. This approach enables operators to initiate a PHY migration either on demand (e.g., during planned maintenances) or to set up automatic migration on unexpected events (e.g., server failures).

In an aspect, a server system supporting a radio access network (RAN) is provided. The server system includes a first message controller associated with a first RAN server and memory storing instructions that, when executed by a processor, cause the first message controller to perform a set of operations. The set of operations include intercepting a first message from a first layer one (PHY) of the first RAN server, where the first message is directed to a first layer two (L2) of the first RAN server over a first communication channel. Additionally, the operations include converting the first message into one or more first network packets, where converting the first message into the one or more first network packets comprises dropping state information of the first PHY associated with at least one slot. The set of operations further include re-routing the first message to a second layer two (L2) of a second RAN server by transmitting the one or more first network packets at a slot boundary via a network.

In another aspect, a method of re-routing a message from a first RAN server to a second RAN server of a radio access network (RAN) is provided. The method includes, placing, by a PHY processor in the first RAN server, the message in a first memory of the first RAN server. The method further includes converting, by a first message controller in the first RAN server, the message in the first memory into one or more network packets, where converting the message into the one or more network packets comprises dropping state information of the PHY processor for at least one slot. Additionally, the method includes re-routing, by the first message controller, the one or more network packets to a second message controller in the second RAN server at a slot boundary via a network.

In yet another aspect, a method of re-routing a message from a first RAN server to a second RAN server of a radio access network (RAN) is provided. The method includes intercepting, by a first message controller in the first RAN server, the first message from a first layer one (PHY) in the first RAN server to a first layer two (L2) in the first RAN server over a communication channel. Additionally, the method includes converting, by the first message controller, the first message into one or more first network packets, where converting the first message into the one or more first network packets comprises dropping state information of the first PHY associated with at least one slot. The method further includes re-routing, by the first message controller, the first message to a second layer two (L2) of a second RAN server by transmitting the one or more first network packets at a slot boundary via a network.

This Summary is provided to introduce a selection of concepts in a simplified form, which is further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the following description and, in part, will be apparent from the description, or may be learned by practice of the disclosure.

BRIEF DESCRIPTIONS OF THE DRAWINGS

Non-limiting and non-exhaustive examples are described with reference to the following figures.

DETAILED DESCRIPTION

Various aspects of the disclosure are described more fully below with reference to the accompanying drawings, which form a part hereof, and which show specific example aspects. However, different aspects of the disclosure may be implemented in many different ways and should not be construed as limited to the aspects set forth herein; rather, these aspects are provided so that this disclosure will be thorough and complete, and will fully convey the scope of the aspects to those skilled in the art. Practicing aspects may be as methods, systems, or devices. Accordingly, aspects may take the form of a hardware implementation, an entirely software implementation or an implementation combining software and hardware aspects. The following detailed description is, therefore, not to be taken in a limiting sense.

According to the present disclosure, the above and other issues are resolved by dynamically re-routing layer traffic between different servers with little user-visible disruptions and without modifications to the vRAN software stack. This approach enables operators to initiate a PHY migration either on demand (e.g., during planned maintenances) or to set up automatic migration on unexpected events (e.g., server failures).

As described further herein, PHY processing in cellular networks has no hard state that must be migrated. As a result, layer traffic such as the PHY-L2 traffic (e.g., traffic from PHY to L2) or L2-PHY traffic (e.g., traffic from L2 to PHY) can be simply re-routed to a different server. This re-routing mechanism is realized by interposing one or more message controllers (e.g., middlebox) in a communication channel between the PHY and L2. In one aspect, the communication channel may be a shared-memory channel. In another aspect, the communication channel may be network channel using a network functional application platform interface (nFAPI).

Layer traffic includes messages exchanged between the PHY and L2 in the communication channel. The messages between the PHY and L2 are intercepted by the one or more message controllers and re-routed between servers via an edge datacenter's network using any suitable protocol, such as a user datagram protocol (UDP), a stream control transmission protocol (SCTP), remote direct memory access (RDMA), etc. In particular, the messages are obtained from the communication channel and converted into one or more network packets (e.g., by adding packet headers). The one or more network packets encapsulating the messages are then transmitted over the edge datacenter's network to the appropriate server. In this regard, the dynamic re-routing of the PHY-L2 (or L2-PHY) traffic becomes transparent to existing vRAN software and hardware components.

Figure 1:
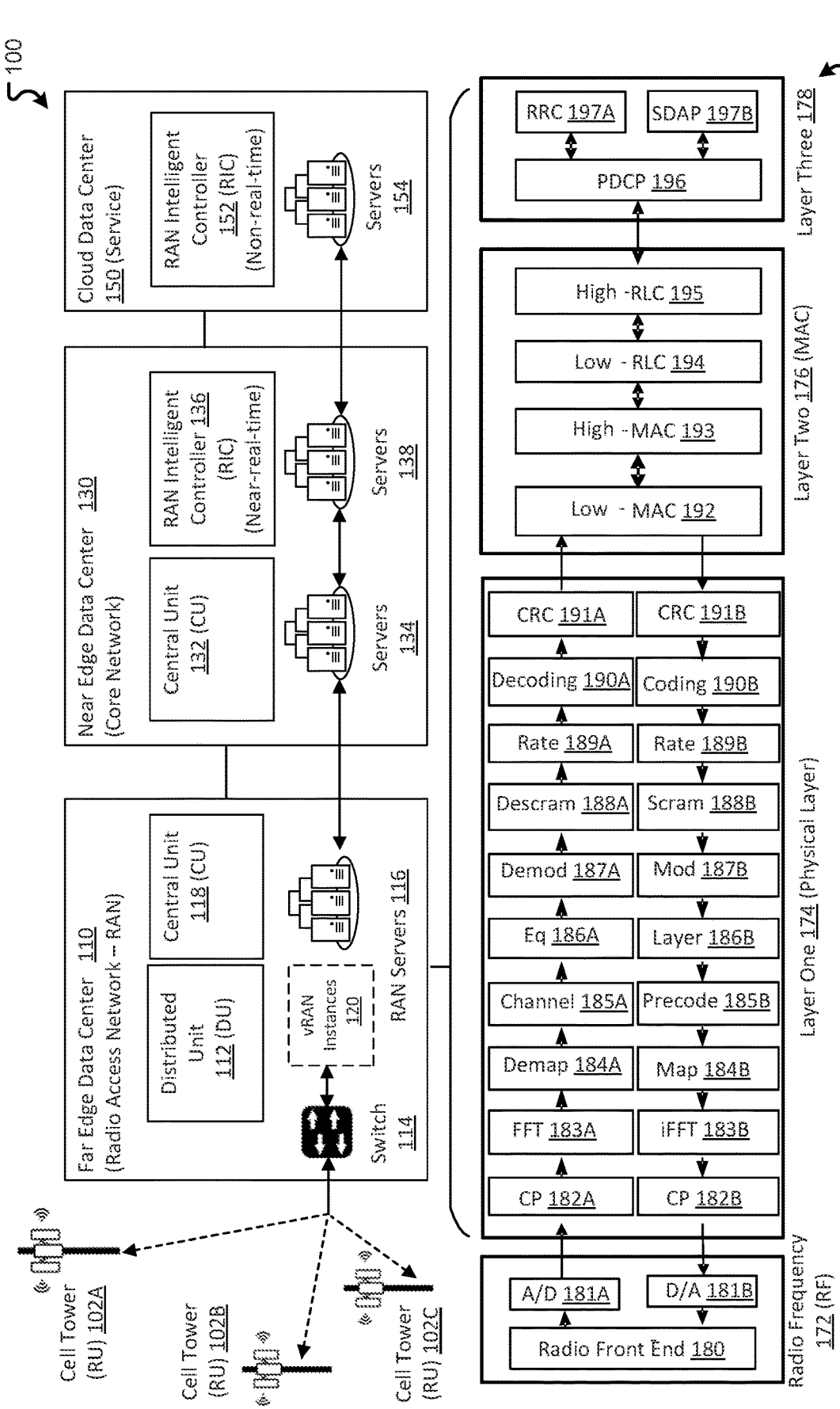
FIG. 1 illustrates an overview of an example system implementing a cloud RAN in accordance with aspects of the present disclosure.

FIG. 1 illustrates an overview of an example system 100 in which dynamic re-routing of layer traffic may be implemented. A mobile wireless telecommunication network, such as the system 100, may use a cloud service for implementing a RAN. In this case, the cloud service connects cell towers, with which mobile devices (e.g., smartphones) connect, to the public network (e.g., the Internet), telecommunication networks, private networks, or other suitable networks. The cloud service provides virtual servers and other computing resources for dynamically scaling the computing capacity as needed based on the volume of data traffic (e.g., to and from the mobile devices). In aspects, a cloud RAN infrastructure represents an implementation of cloud services for the RAN. In contrast to a typical cloud service, the cloud RAN infrastructure may include geographical and physical constraints as well as latency constraints imposed by RAN standards. The cloud RAN infrastructure includes connection to at least one cell tower associated with an RU and cloud servers associated with one or more of a distributed unit (DU), a central unit (CU), and a RAN intelligent controller (RIC). The cell tower is in the field, where mobile devices connect over wireless cellular communications, and the RU of the cell tower connects to a DU of a RAN server at a far-edge datacenter. To enable real-time processing of RAN data traffic, the far-edge datacenter is relatively close (e.g., a few kilometers) to the cell tower.

As noted above, the DU is associated with network switches and processes data in a series of operations associated with at least layer one (physical layer, L1) and layer two (data link layer, L2) of the Open Systems Interconnection (OSI) model. The physical layer connects a data link layer device (e.g., MAC) to a physical medium (e.g., optical fiber, copper cable, etc.). In aspects, a switch is a hardware device that connects devices on a digital network by using packet switching to receive and forward data to a destination device. Packet switching involves grouping the transmitted data into "packets." A "header" of each packet includes a "MAC address," which is a unique identifier used to direct the packet in the data link layer to a destination device. A "payload" of each packet includes the transmitted data, which is ultimately extracted and used by application software. Some switches include integrated circuit chips programed to process packets according to fixed rules associated with a limited set of networking protocols. Other switches are programmable based on a protocol independent switch architecture which enables developers to program each stage of packet processing.

In the example embodiment shown in FIG. 1, cell towers 102A-C transmit and receive wireless communications with mobile computing devices (e.g., smartphones) over a RAN. The example system 100 further includes a far-edge datacenter 110 (switches, RAN servers), a near-edge datacenter 130 (core network servers), and a cloud datacenter 150 (cloud services). In aspects, the example system 100 corresponds to a cloud RAN infrastructure for a mobile wireless telecommunication network.

The far-edge datacenter 110 includes a DU 112 and a CU 118. In aspects, the far-edge datacenter 110 enables cloud integration with a RAN. The far-edge datacenter 110 includes a switch 114 and RAN servers 116 configured to host vRAN instances 120 for processing RAN data. A vRAN is a type of RAN in which networking functions (including the control and data planes) are separated from the hardware that hosts the vRAN (e.g., RAN servers 116 host the vRAN instances 120). In general, network function virtualization involves enabling software to perform hardware-based functions. This leads to increased responsiveness to network fluctuations and increased flexibility for enhancement since software can be upgraded or repaired more easily than hardware.

The switch 114 and RAN servers 116 process incoming data traffic and outgoing data traffic associated with a layer one (physical layer) 174 and at least a part of a layer two (MAC, RLC) 176. In aspects, the far-edge datacenter 110 is at a remote site from the cloud datacenters associated with the core network and cloud services. For example, the remote site may be located within a few kilometers or more of the cell towers 102A-C. In aspects, the upstream data traffic corresponds to data flowing from the cell towers 102A-C to servers 154 in the cloud datacenter 150. Similarly, the downstream data traffic corresponds to data flowing from the cloud datacenter 150 to the cell towers 102A-C.

The near-edge datacenter 130 (e.g., hosting the core network) includes a CU 132 and a RAN intelligent controller 136 (RIC). The CU 132 is associated with servers 134 and the RIC 136 is associated with servers 138. In aspects, the near-edge datacenter 130 is at a regional site of a private cloud service. For example, the regional site may be located tens of kilometers from the cell towers 102A-C.

The cloud datacenter 150 includes a RIC 152 associated with the servers 154. For example, the RIC 152 processes non-real-time service operations. In aspects, the cloud datacenter 150 may be at a central location in the cloud RAN infrastructure. For example, the central locations may be located hundreds of kilometers from the cell towers 102A-C.

In aspects, the far-edge datacenter 110, which is closer to the cell towers 102A-C than the cloud datacenter 150, provides real-time processing. In contrast, the cloud datacenter 150, which is furthest from the cell towers 102A-C in the cloud RAN infrastructure, provides processing in a non-real-time manner.

Operational partitions 170 illustrate various operational segments for processing data traffic in the RAN. For example, operational partitions 182-191 may correspond to the layer one 174 processing and operational partitions 192-195 may correspond to the layer two 176 processing of the OSI seven-layer model.

In aspects, conversion of data associated with a radio frequency (RF) 172 occurs prior to processing data at the layer one 174. For data processing of the RF 172, the radio front-end 180 partition receives and sends data through the cell towers 102A-C to mobile computing devices over wireless communications. An analog to digital converter (A/D) 181A converts analog data from the radio front-end 180 to digital data for the upstream data traffic. A digital to analog converter (D/A) 181B converts digital data into analog data for the downstream data traffic. In aspects, the interface between the DU and RU in a cloud RAN is referred to as "fronthaul." The fronthaul defines various "planes" of operations including the "c-plane" (control plane), "u-plane" (user plane), "s-plane" (synchronization plane), and "m-plane" (management plane). In general, c-plane data are directed to scheduling and coordination of data transmission, u-plane data are directed to efficient data transfer, s-plane data are directed to timing and synchronization of data transmission between the RU and DU, and m-plane data relate to managing the RU. Packets having data payloads related to the different planes of operation include corresponding header information (e.g., a "c-plane header," "u-plane header," etc.).

Partitions in the layer one 174 are related to operations for converting coded symbols associated with a bit stream into a physical signal for transmission using communication media (e.g., a physical wire or radio). For example, the layer one 174 may convert coded symbols into in-phase/quadrature (IQ) signals. In aspects, the operational partitions for processing upstream data traffic of the layer one 174 may include CP 182A, FFT 183A, Demap 184A, Channel 185A, Eq 186A, Demod 187A, Descram 188A, Rate 189A, Decoding 190A, and CRC 191A. In aspects, the operational partitions for processing downstream data traffic in the layer one 174 may include CRC 191B, Coding 190B, Rate 189B, Scram 188B, Mod 187B, Layer 186B, Precode 185B, Map 184B, iFFT 183B, and CP 182B.

Partitions in the layer two 176 are related to operations for transferring data frames between network hosts over a physical link. In aspects, partitions in the layer two 176 correspond to the data link layer in the OSI seven-layer model. For example, low-MAC 192 is the lowest partition in the layer two 176. Other partitions above the low-MAC 192 include an ascending sequence of layers, high-MAC 193, low-RLC 194, and high-RLC 195.

Partitions in layer three 178 are related to operations for forwarding data packets through routers. In aspects, layer three 178 corresponds to the network layer in the OSI seven-layer model. The partitions in the layer three 178 may be associated with protocol-governed operations such as packet data convergence protocol 196 (PDCP), radio resource control 197A (RRC) and service data adaptation protocol 197B (SDAP).

In aspects, a combination of the DU 112 and CU 118 in the far-edge datacenter 110 may process partitions associated with the layer one 174, the layer two 176, and at least a part of the layer three 178. In particular, respective servers of the RAN servers 116 may include central processing units (CPUs) and a variety of accelerators for processing data associated with one or more partitions of the operational partitions 170.

As will be appreciated, the various methods, devices, applications, features, etc., described with respect to FIG. 1 are not intended to limit the example system 100 to being performed by the particular applications and features described. Accordingly, additional controller configurations may be used to practice the methods and systems herein and/or features and applications described may be excluded without departing from the methods and systems disclosed herein.

Figure 2A:
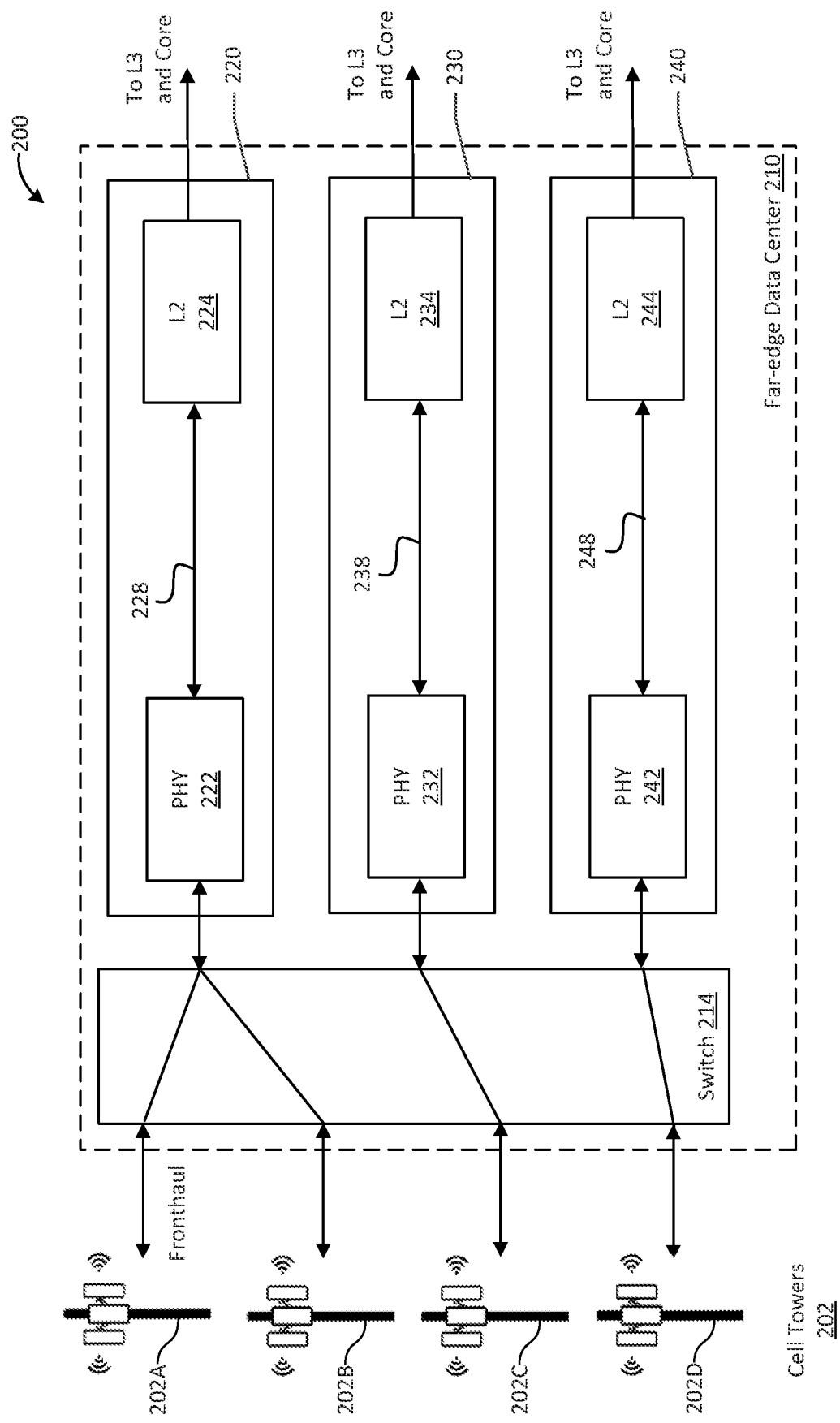
FIG. 2A illustrates an example far-edge datacenter of a cloud RAN in accordance with aspects of the present disclosure.

FIG. 2A illustrates an example far-edge datacenter 210 of a RAN environment 200. The far-edge datacenter 210 includes at least a switch 214 and RAN servers 220, 230 and 240. The switch 214 connects cell towers 202A-D to the RAN servers 220, 230 and 240 via fiber-optic fronthaul links.

In aspects, each RAN server in the far-edge datacenter 210 operates to process data at respective layer one (PHY) and layer two (L2). The PHY is responsible for signal processing tasks (e.g., channel estimation, modulation/demodulation, forward error correction, etc.), while the L2 is responsible for scheduling the frequency and time resources among user equipment (UE). The L2 also connects to higher layers (e.g., L3) as well as the core network. In aspects, the PHY and L2 may run on different servers that communicate with each other using nFAPI.

In an example, each RAN server in the far-edge datacenter 210 may run one PHY and one L2. For example, the RAN server 220 may run PHY 222 and L2 224 that communicate via a communication channel 228; the RAN server 230 may run PHY 232 and L2 234 that communicate via a communication channel 238; and the RAN server 240 may run PHY 242 and L2 244 that communicate via a communication channel 248. In aspects, the communication channels 228, 238 and 248 may be shared-memory channels.

In the RAN environment 200, the mappings between components are typically fixed (e.g., cell towers to servers). Moreover, the PHY and L2 must be placed on the same server because they communicate over the shared memory. Such setup, however, can have a drastic impact on user connectively. For example, when a fault occurs in a PHY process (e.g., hardware failure, software failure, etc.), a UE may become disconnected for an extended period of time (e.g., as much as 170 seconds) due to the time needed for the L2 to initialize a new PHY and for the UE to re-attach to the cell tower. As an example, when updating a PHY software (e.g., planned maintenance), connectively downtime may be created because stopping the current PHY application and restarting a new version disconnects cell towers from the PHY.

Figure 2B:
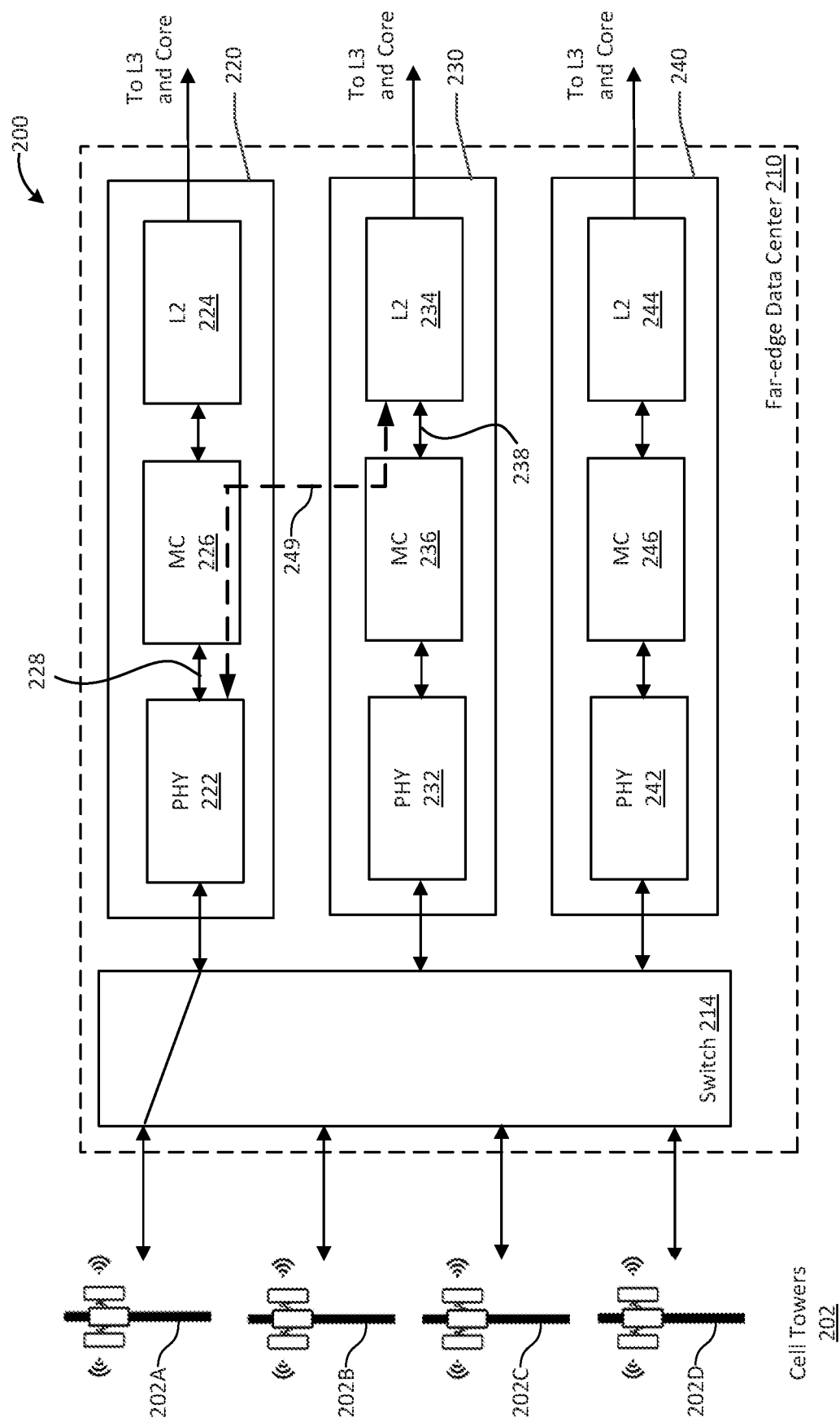
FIG. 2B illustrates an example far-edge datacenter of a cloud RAN implementing dynamic re-routing of layer traffic in accordance with aspects of the present disclosure.

To address the above issues, FIG. 2B illustrates an implementation of dynamic re-routing of layer traffic. Dynamic re-routing of layer traffic is possible because PHY processing is focused on signal processing tasks against radio data, and in some examples, only performing signal processing tasks against the radio data. This means that a PHY process can be transferred across servers without any state transfer since the L2 and higher layers maintain related states, such as the states of the PHY, RUs, UEs and other resources. Although dynamic re-routing of layer traffic does not require state transfer for the PHY, the PHY is not entirely stateless. Instead, the PHY is "slot-stateless," meaning that discarding the PHY's state across slots does not substantially affect end user connectivity.

A slot is a basic unit of time in radio protocols. The PHY performs work at the granularity of slots. For example, for every slot, the L2 issues requests to the PHY that describe the signal processing tasks to be performed during that slot (e.g., the set of UEs active in that slot, the resource blocks used by each UE, the modulation scheme used by each UE, etc.). The PHY returns per-slot responses with the data decoded on the uplink. Dynamic re-routing of layer traffic between servers occurs at or near the slot boundaries. Specifically, if the original PHY process is performed for slots 0 to i, then the new PHY process can be re-routed to subsequent slots (e.g., i+1, i+2, etc.). Within a slot, PHY processing generates a large amount of intra-slot state in the form of intermediate computation results (e.g., demodulated data before decoding).

Downlink PHY processing is generally slot-stateless, which allows for any such state to be discarded without significant changes to a downlink in-phase/IQ sample packet stream generated by the PHY layer. As one example of uplink PHY processing state, a signal to noise ratio (SNR) value may be maintained for selecting a PHY encoding process (e.g., modulation and coding scheme). However, the SNR state can be ignored during migration, causing the destination PHY to use a stale or default SNR value. This is acceptable because the RAN is already designed to handle such a changed SNR value. As another example of uplink PHY processing state, a hybrid automatic repeat request (HARD) buffer may store one or more previously received transmissions for decoding a transmission that the PHY failed to decode. However, the HARQ buffer may also be ignored during migration, causing the destination PHY to use a stale or default HARQ buffer. In this case, PHY or L2-level checks will fail, but the RAN is designed to handle such failures by retransmissions at the RAN's higher layers (e.g., RLC and L3). Thus, ignoring HARQ buffers during migration is also acceptable. Thus, dynamic re-routing of layer traffic may be treated as slot-stateless in the sense that ignoring uplink and downlink PHY state across "slots" does not cause substantial user-visible disruptions (e.g., noticeably higher latency).

In FIG. 2B, each RAN server in the far-edge datacenter 210 may run one PHY, one L2, and a message controller (MC). For example, the RAN server 220 may run PHY 222, L2 224 and MC 226; the RAN server 230 may run PHY 232, L2 234 and MC 236; and the RAN server 240 may run PHY 242, L2 244 and MC 246. In other examples, a RAN server may run a PHY and a MC (not shown) or a L2 and a MC (not shown). Dynamic re-routing allows a PHY process running in one PHY of one RAN server to be moved to another PHY running on a different RAN server. To implement this, the MC is interposed between the PHY and L2, where the MC includes a PHY side and a L2 side. Alternatively, for a RAN server running one PHY or one L2, a MC may be associated with the PHY or the L2 on the RAN server, respectively.

In aspects, the MCs 226, 236 and 246 may be software-based modules executed by processors (e.g., CPUs) in the respective RAN servers. Each MC is configured as a shim layer between the PHY and L2 processes. As a result, the MCs 226, 236 and 246 are compatible with existing vRAN components and hide the existence of any re-routing between PHY and L2. The MCs 226, 236 and 246 are also agnostic to the implementation of other vRAN components so as to allow even closed source PHY and L2 implementations.

The MCs 226, 236 and 246 communicate with each other over the far-edge datacenter 210's network. In this way, each MC can communicate using a network protocol with no inter-slot state, which in turn enables the dynamic re-routing of layer traffic at slot boundaries. Packet losses are rare since the far-edge datacenter 210 statically provisions the network with the required bandwidth and there are no congestion-inducing incast-like situations. To reduce latency, the MCs 226, 236 and 246 may use one or more established techniques (e.g., kernel-bypass networking, core pinning, lock-free data structures, busy-polling, process-to-completion, etc.) running on a dedicated core to handle any network channel, in various examples.

In aspects, the MCs 226, 236 and 246 allow the PHY and L2 to run on different servers by converting messages in the communication channel between the PHY and L2 into one or more network packets to be transmitted over the far-edge datacenter 210's network. To do so, the MCs 226, 236 and 246 ensure that the PHY and L2 receive messages that comply with the femtocell application programming interface (FAPI) specification. In some examples, the MCs 226, 236 and 246 can be configured to receive/send messages that comply with other suitable specifications.

As illustrated in FIG. 2B, the cell tower 202A is connected to the RAN server 220 by the switch 214. For a PHY-to-L2 messaging path, the PHY 222 in the RAN server 220 attempts to connect to the L2 224 over the communication channel 228 in the RAN server 220. However, the PHY 222 is connected to the MC 226 instead. As such, when the PHY 222 sends a FAPI message 249 to the L2 224, the MC 226 intercepts that message over the communication channel 228 and re-routes the message to the MC 236 in the RAN server 230 via the far-edge datacenter 210's network. The MC 236 then receives the FAPI message 249 and forwards the FAPI message 249 to the L2 234 over the communication channel 238 in the RAN server 230. As a result, process from the PHY 222 is seamlessly re-routed to the L2 234 to run on a different server. The L2-to-PHY messaging path is similar, but in the reverse direction.

Figure 2C:
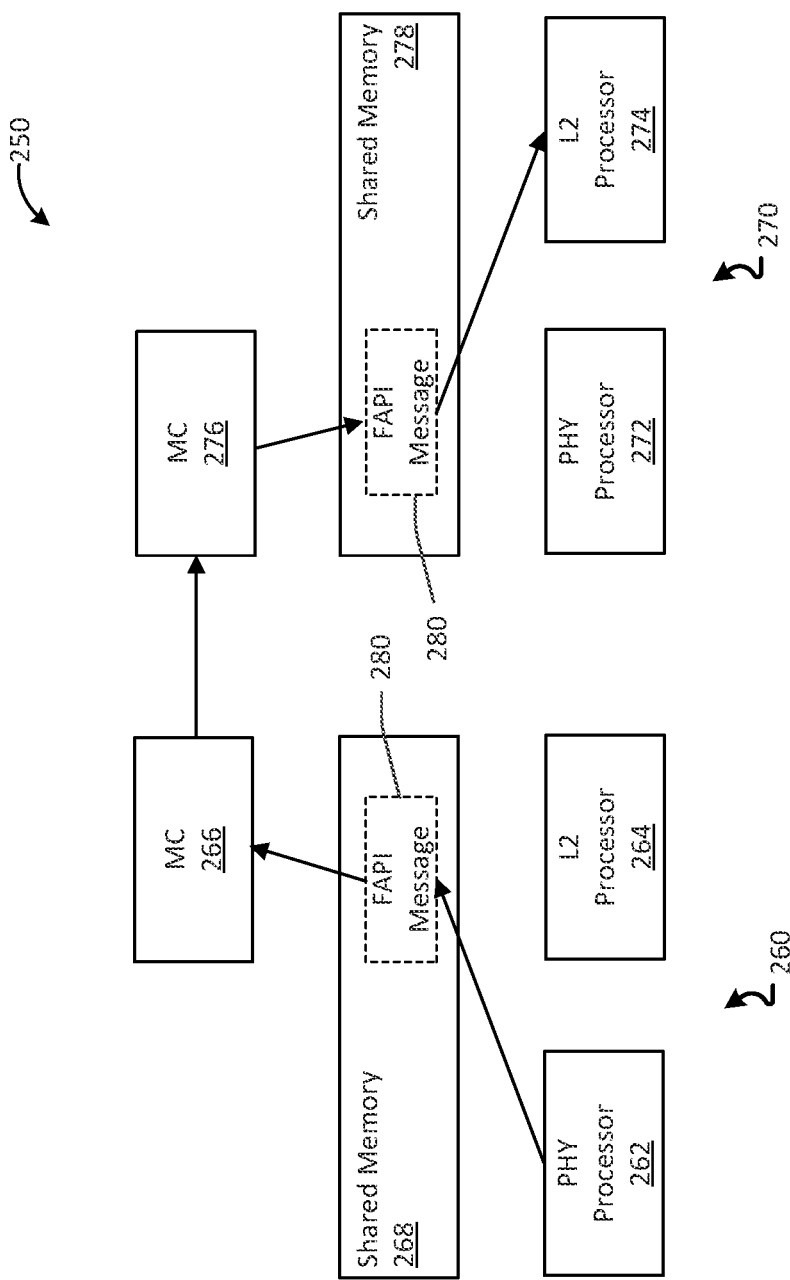
FIG. 2C illustrates an example process for dynamic re-routing of layer traffic in accordance with aspects of the present disclosure.

FIG. 2C illustrates an example process 250 for dynamic re-routing of layer traffic. The process 250 may be implemented in the far-edge datacenter 210 of FIG. 2B. In aspects, the process 250 involves message re-routing between RAN servers 260 and 270. The RAN server 260 may run a PHY layer and a L2 layer with a PHY processor 262 and a L2 processor 264, respectively. Similarly, the RAN server 270 may run a PHY layer and a L2 layer with a PHY processor 272 and an L2 processor 274.

Each RAN server includes a MC. For example, the RAN server 260 includes a MC266 and the RAN server 270 includes a MC276. The MCs 266 and 276 operate to re-route layer traffic (e.g., PHY-L2, L2-PHY) in the RAN servers 260 and 270. To do so, the MC266 continuously monitors for messages in a shared memory 268 and the MC 276 continuously monitors for messages in a shared memory 278. In aspects, the shared memories 268 and 278 are located in respective RAN servers 260 and 270.

For a PHY-L2 messaging, the PHY processor 262 may attempt to send a FAPI message 280 to the L2 processor 264 by placing the FAPI message 280 in the shared memory 268. However, the FAPI message 280 will be re-routed to the L2 processor 274 instead. In particular, the MC266 monitors the shared memory 268 to intercept the FAPI message 280. The MC 266 makes a copy of the FAPI message 280 from the shared memory 268 and forwards that message to the MC 276 via a network channel (e.g., the far-edge datacenter 210's network). Once received, the MC 276 saves the copy of the FAPI message 280 in the shared memory 278. The L2 processor 274 is then able to access the FAPI message 280 in the shared memory 278. For an L2-to-PHY messaging, the process is in the reverse direction.

In aspects, each message controller may be implemented as two separate components. For example, the MC266 includes a first controller portion coupled to the PHY processor 262 and a second controller portion coupled to the L2 processor 264. Similarly, the MC 276 includes a third controller portion coupled to the PHY processor 272 and a fourth controller portion coupled to the L2 processors 274. In operation, a message from the PHY processor 262 to the L2 processor 264 is intercepted by the first controller portion of the MC 266. The first controller portion of the MC 266 then sends the message to the fourth controller portion of the MC276 so that the message is re-routed to the L2 processor 274 instead.

Dynamic re-routing of layer traffic can serve to improve several important system properties. First, a PHY process can crash due to various reasons (e.g., hardware failures, crashes of the platform software, etc.). Using dynamic re-routing, the PHY process can resume at a different server which allows vRAN operators to exploit the fungibility of cheap commodity servers to improve availability. Second, updating the PHY software in current vRAN deployments creates user downtime since an active PHY processing needs to be stopped and restarted with a new version of the software. Using dynamic re-routing, vRAN operators can spawn a new PHY process and move the RU into the new PHY process without downtime. Third, large variations in user traffic can cause certain portions of RANs to be underutilized. Current vRANs deployments do not take into consideration ways to reduce energy consumption. Using dynamic re-routing, vRAN operators can increase energy efficiency by bin-packing the PHY processing into the fewest number of servers based on the current workload and converting the remaining idle servers into a power-saving/power-off state.

Figure 3A:
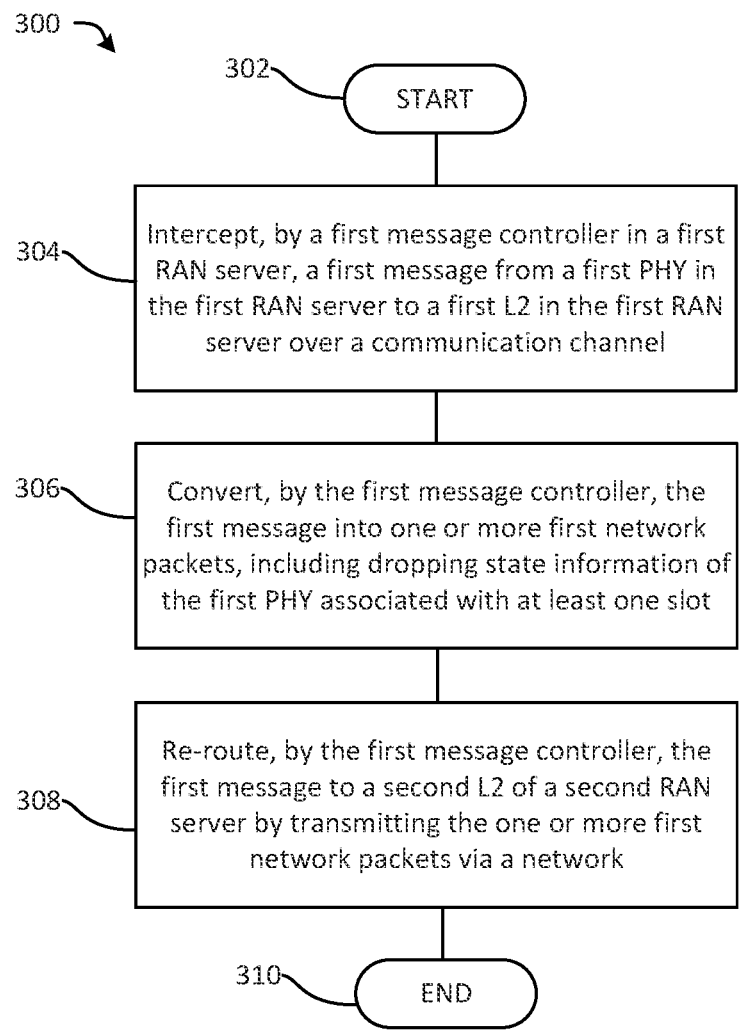
FIG. 3A illustrates an example method for dynamic re-routing of layer traffic in accordance with aspects of the present disclosure.

FIG. 3A illustrates an example method 300 for dynamic re-routing of layer traffic. A general order of the operations for the method 300 is shown in FIG. 3A. Generally, the method 300 begins with start operation 302 and ends with end operation 310. The method 300 may include more or fewer steps or may arrange the order of the steps differently than those shown in FIG. 3A. The method 300 can be executed as a set of computer-executable instructions executed by a computer system and encoded or stored on a computer readable medium. Further, the method 300 can be performed by gates or circuits associated with a processor, an ASIC, an FPGA, a SOC or other hardware device. Hereinafter, the method 300 shall be explained with reference to the systems, components, devices, modules, software, data structures, data characteristic representations, signaling diagrams, methods, etc., described in conjunction with FIGS. 1, 2A-2C, 4, and 5A-B. For example, aspects of method 300 may be performed by RAN servers, such as the RAN servers 116 of FIG. 1, the RAN servers 220, 230 and 240 of FIGS. 2A-2B and the RAN servers 260 and 270 of FIG. 2C.

Following the start operation 302, servers associated with a far-edge datacenter of a cloud RAN may execute dynamic re-routing of layer traffic. For example, a first message controller running on a first RAN server and a second message controller running on a second RAN server in the far-edge datacenter may operate to re-route PHY processing from the first RAN server to the second RAN server and vice versa. In aspects, the first and second RAN servers may be different servers.

At intercepting operation 304, the first message controller intercepts a first message transmitted from a first layer one (PHY) to a first layer two (L2) in the first RAN server over a communication channel. In one aspect, the communication channel is a shared-memory channel. For example, the first message controller intercepts the first message by obtaining the first message in the shared-memory channel. In another aspect, the communication channel is a network channel using nFAPI. For example, the first message controller intercepts the first message by obtaining the first message transmitted over the network channel.

At converting operation 306, the first message controller converts the first message into one or more first network packets. In aspects, the converting includes dropping or ignoring state information associated with the first PHY of the first RAN server.

At re-routing operation 308, the first message controller re-routes the first message to the second RAN server. For example, the first message controller transmits the one or more first network packets encapsulating the first message to the second RAN server at a slot boundary via a network. Based on dropping the state information of the first PHY of the first RAN server, the transmission of the one or more first network packets is performed with a minimal effect on bandwidth.

In aspects, the second message controller receives the first message and establishes a connection to a second layer in the second RAN server. The second message controller then forwards the first message to the second layer in the second RAN server.

In aspects, the second message controller intercepts a second message transmitted from a second layer to a first layer in the second RAN server. The second message controller converts the second message into one or more second network packets. The second message controller then re-routes the second message to the first RAN server by transmitting the one or more second network packets via the network. In turn, the first message controller receives the second message and establishes a connection to the first layer in the first RAN server. The first message controller then forwards the second message to the first layer in the first RAN server.

In aspects, the first and second messages may be FAPI-compliant messages such that the first message is a first FAPI message and the second message is a second FAPI message. As such, the first message controller may use a network protocol with no inter-slot state to transmit the first FAPI message to the second RAN server via the network. Similarly, the second message controller uses the network protocol with no inter-slot state to transmit the second FAPI message to the first RAN server via the network. The first and second FAPI messages may be transmitted at the slot boundary.

As should be appreciated, the operations 302-310 are described for purposes of illustrating the present methods and systems and are not intended to limit the disclosure to a particular sequence of steps. That is, steps may be performed in different order, additional steps may be performed, and disclosed steps may be excluded without departing from the present disclosure.

Figure 3B:
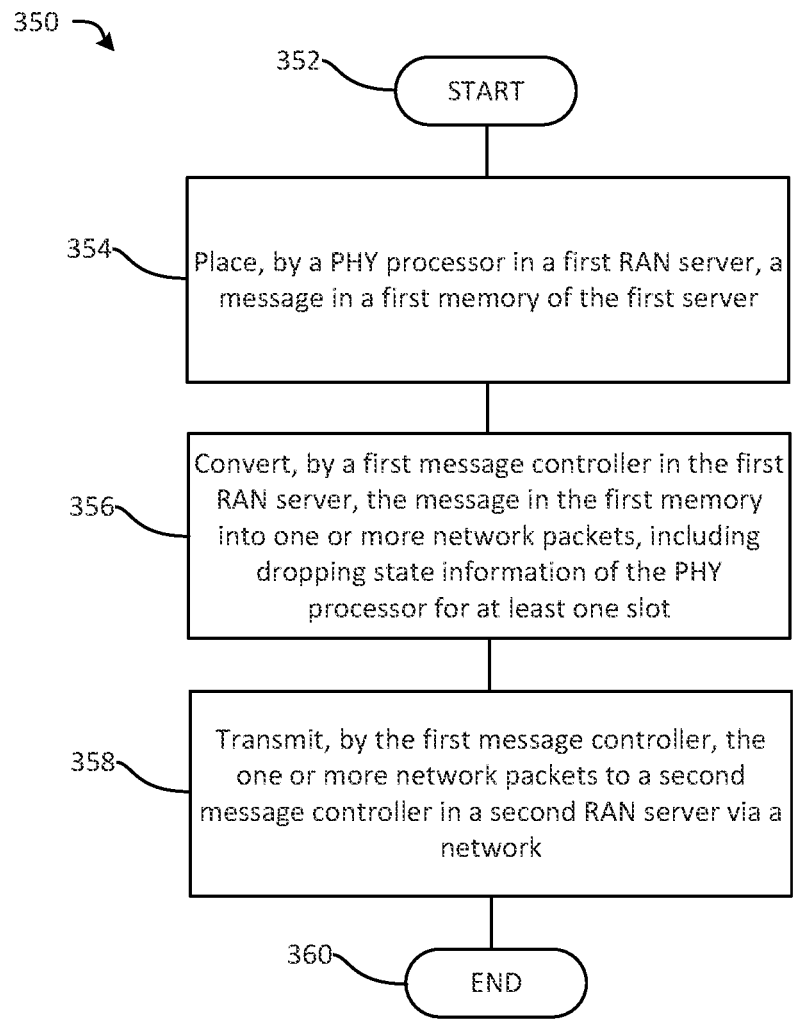
FIG. 3B illustrates another example method for dynamic re-routing of layer traffic in accordance with aspects of the present disclosure.

FIG. 3B illustrates another example method 350 for dynamic re-routing of layer traffic. A general order of the operations for the method 350 is shown in FIG. 3B. Generally, the method 350 begins with start operation 352 and ends with end operation 360. The method 350 may include more or fewer steps or may arrange the order of the steps differently than those shown in FIG. 3B. The method 350 can be executed as a set of computer-executable instructions executed by a computer system and encoded or stored on a computer readable medium. Further, the method 350 can be performed by gates or circuits associated with a processor, an ASIC, an FPGA, a SOC or other hardware device. Hereinafter, the method 350 shall be explained with reference to the systems, components, devices, modules, software, data structures, data characteristic representations, signaling diagrams, methods, etc., described in conjunction with FIGS. 1, 2A-2C, 4, and 5A-B. For example, aspects of method 350 may be performed by RAN servers, such as the RAN servers 116 of FIG. 1, the RAN servers 220, 230 and 240 of FIGS. 2A-2B and the RAN servers 260 and 270 of FIG. 2C.

Following the start operation 352, one or more message controllers may execute dynamic re-routing of layer traffic. At placing operation 354, a first PHY processor in a first RAN server places (e.g., stores) a message in a first memory of the first RAN server. For example, the message may be a FAPI-compliant message. At converting operation 356, a first message controller in the first RAN server converts the message in the first memory into one or more network packets. In examples, the converting includes dropping or ignoring state information associated with the first PHY processor of the first RAN server.

At transmitting operation 358, the first message controller transmits the one or more network packets to a second message controller in a second RAN server at a slot boundary via a network. Based on the dropping the state information of the first PHY processor, the transmission of the one or more network packets is performed with a minimal effect on bandwidth.

In turn, the second message controller receives the message via the network. The second message controller stores the message in a second memory of the second RAN server. A L2 processor of the second RAN server can then access the message in the second memory.

In aspects, the PHY processor is a first PHY processor and the L2 processor is a second L2 processor in the first RAN server. The first memory is shared between the first PHY processor and a first L2 processor. The second memory is shared between the second PHY processor and the second L2 processor in the second RAN server.

As should be appreciated, the operations 352-360 are described for purposes of illustrating the present methods and systems and are not intended to limit the disclosure to a particular sequence of steps. That is, steps may be performed in different order, additional steps may be performed, and disclosed steps may be excluded without departing from the present disclosure.

Figure 4:
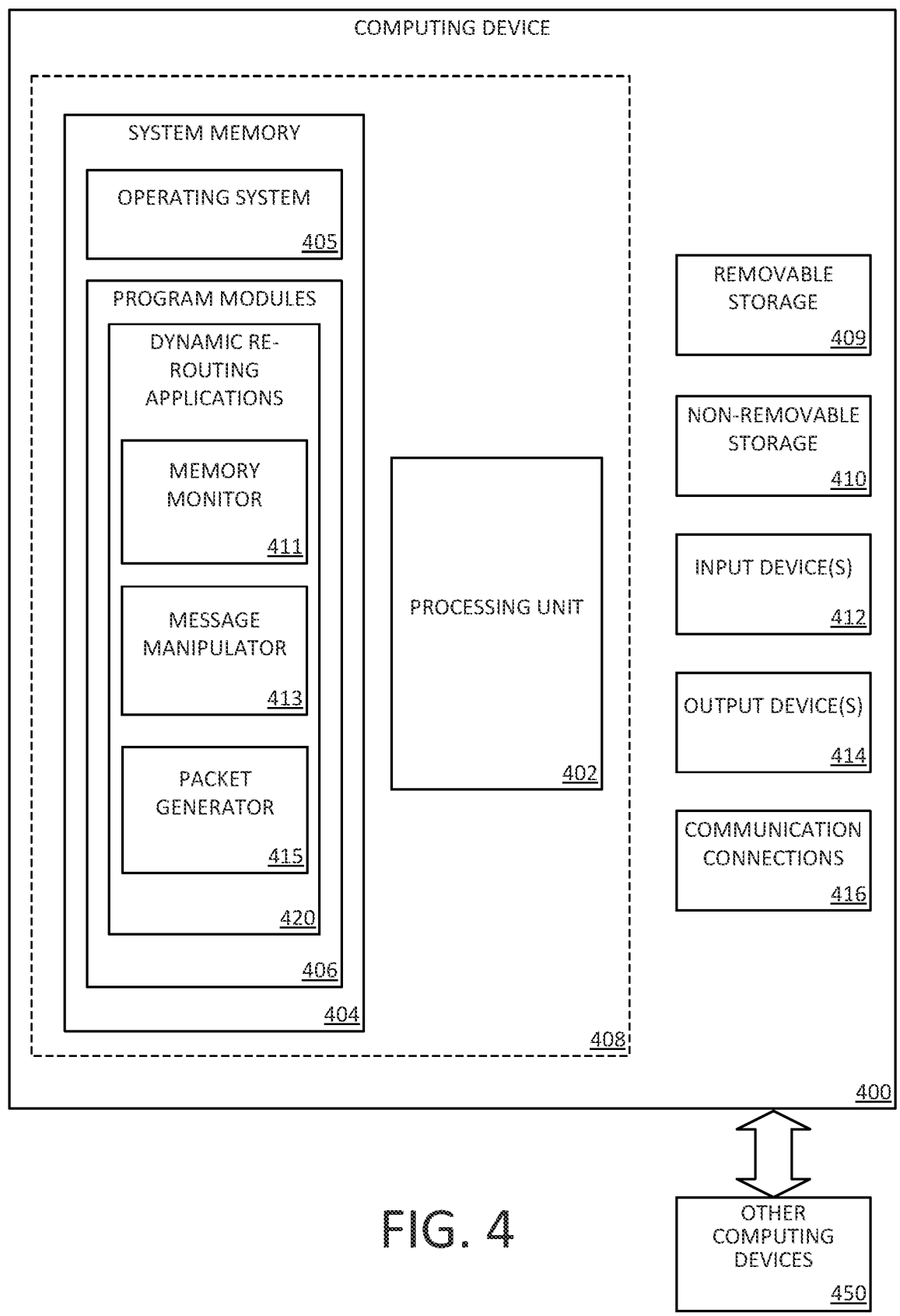
FIG. 4 is a block diagram illustrating example physical components of a computing device with which aspects of the present disclosure may be practiced.

FIG. 4 is a block diagram illustrating physical components (e.g., hardware) of a computing device 400 with which aspects of the disclosure may be practiced. The computing device components described below may have computer executable instructions for implementing dynamic re-routing applications 420 including computer executable instructions for the dynamic re-routing applications 420 that can be executed to implement the methods disclosed herein. In a basic configuration, the computing device 400 may include at least one processing unit 402 and a system memory 404. Depending on the configuration and type of computing device, the system memory 404 may comprise, but is not limited to, volatile storage (e.g., random access memory), non-volatile storage (e.g., read-only memory), flash memory, or any combination of such memories. The system memory 404 may include an operating system 405 and one or more program modules 406 suitable for running the dynamic re-routing applications 420, such as one or more components and, in particular, memory monitor 411, message manipulator 413, and/or packet generator 415.

In aspects, the memory monitor 411 monitors a shared-memory channel for messages communicated between a PHY layer and a L2 layer. The message manipulator 413 creates copies of the messages in the shared-memory channel to be transmitted. The packet generator 415 processes the copies of the messages into network packets and transmits the network packets over a network channel.

The operating system 405, for example, may be suitable for controlling the operation of the computing device 400. Furthermore, embodiments of the disclosure may be practiced in conjunction with a graphics library, other operating systems, or any other application program and is not limited to any particular application or system. This basic configuration is illustrated in FIG. 4 by those components within a dashed line 408. The computing device 400 may have additional features or functionality. For example, the computing device 400 may also include additional data storage devices (removable and/or non-removable) such as, for example, magnetic disks, optical disks, or tape. Such additional storage is illustrated in FIG. 4 by a removable storage device 409 and a non-removable storage device 410.

As stated above, a number of program modules and data files may be stored in the system memory 404. While executing on the processing unit 402, the program modules 406 may perform processes including, but not limited to, the aspects, as described herein. Other program modules that may be used in accordance with aspects of the present disclosure, may include the memory monitor 411, the message manipulator 413, and/or the packet generator 415, etc.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 4 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 400 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

The computing device 400 may also have one or more input device(s) 412 such as a keyboard, a mouse, a pen, a sound or voice input device, a touch or swipe input device, etc. The output device(s) 414 such as a display, speakers, a printer, etc. may also be included. The aforementioned devices are examples and others may be used. The computing device 400 may include one or more communication connections 416 allowing communications with other computing devices 450. Examples of suitable communication connections 416 include, but are not limited to, RF transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 404, the removable storage device 409, and the non-removable storage device 410 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 400. Any such computer storage media may be part of the computing device 400. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, RF, infrared, and other wireless media.

Figure 5A:
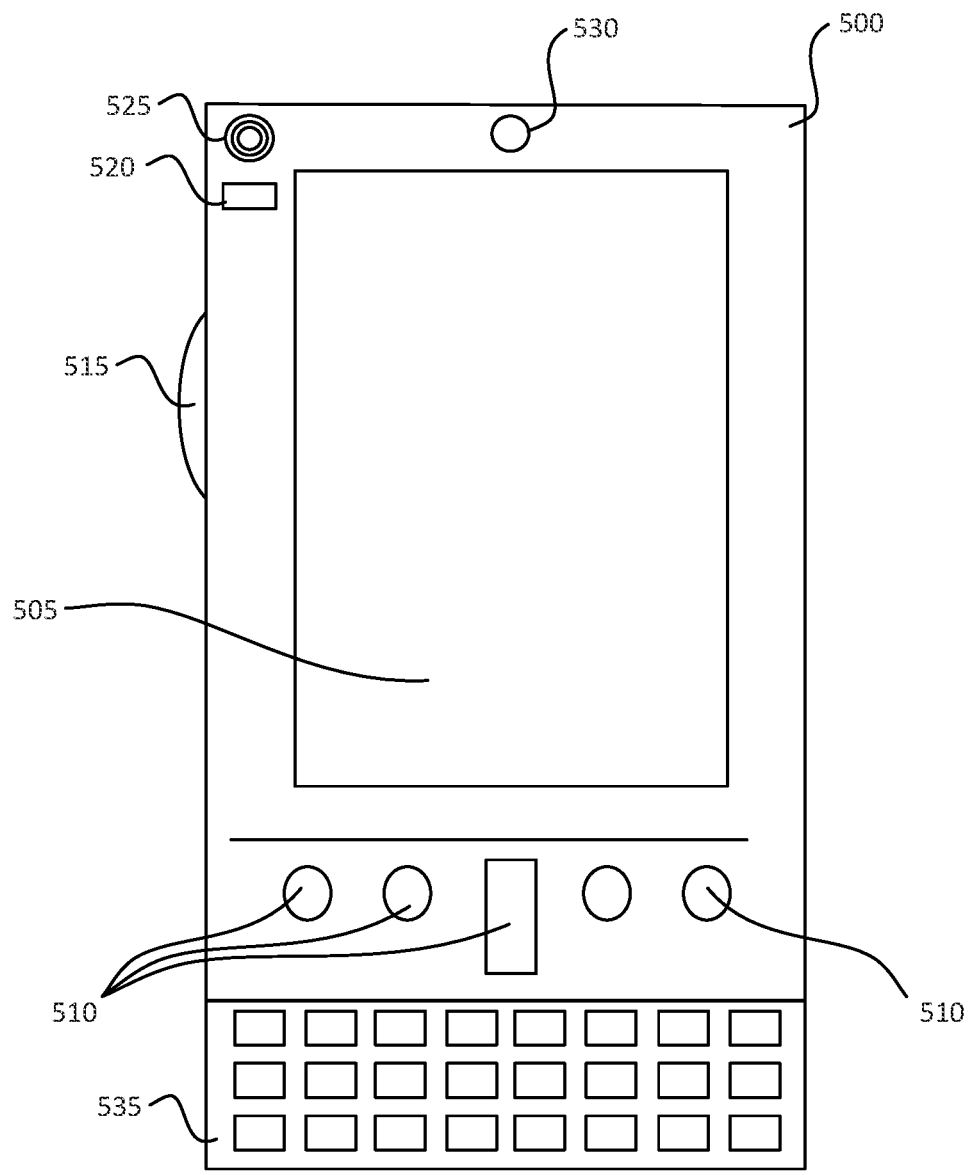
FIG. 5A is a simplified diagram of a mobile computing device with which aspects of the present disclosure may be practiced.
Figure 5B:
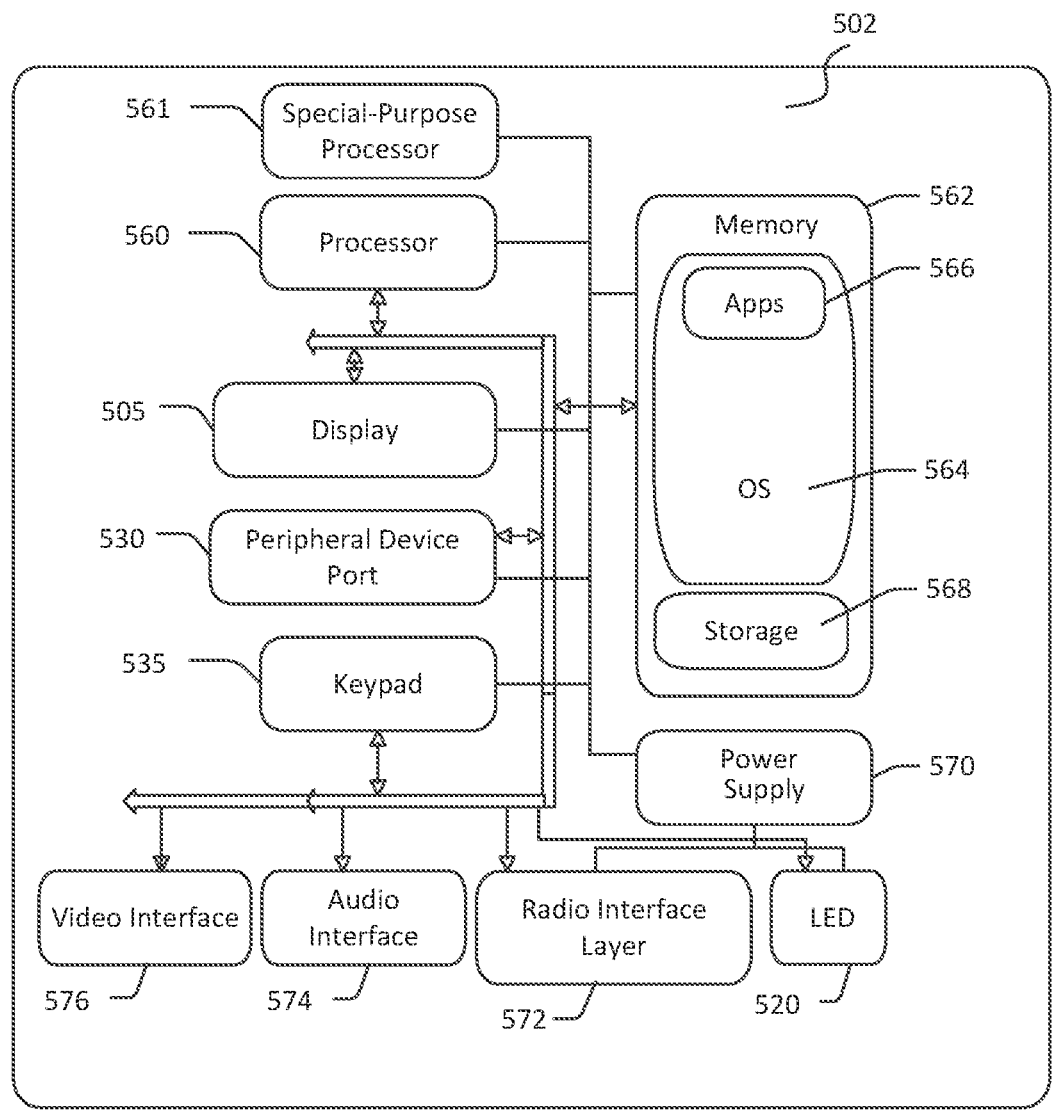
FIG. 5B is another simplified block diagram of a mobile computing device with which aspects of the present disclosure may be practiced.

FIGS. 5A and 5B illustrate a mobile computing device 500, for example, a mobile telephone, a smart phone, wearable computer (such as a smart watch), a tablet computer, a laptop computer, and the like, with which embodiments of the disclosure may be practiced. In some aspects, the client may be a mobile computing device. With reference to FIG. 5A, one aspect of a mobile computing device 500 for implementing the aspects is illustrated. In a basic configuration, the mobile computing device 500 is a handheld computer having both input elements and output elements. The mobile computing device 500 typically includes a display 505 and one or more input buttons 510 that allow the user to enter information into the mobile computing device 500. The display 505 of the mobile computing device 500 may also function as an input device (e.g., a touch screen display). If included, an optional side input element 515 allows further user input. The side input element 515 may be a rotary switch, a button, or any other type of manual input element. In alternative aspects, mobile computing device 500 may incorporate more or less input elements. For example, the display 505 may not be a touch screen in some embodiments. In yet another alternative embodiment, the mobile computing device 500 is a portable phone system, such as a cellular phone. The mobile computing device 500 may also include an optional keypad 535. Optional keypad 535 may be a physical keypad or a "soft" keypad generated on the touch screen display. In various embodiments, the output elements include the display 505 for showing a graphical user interface (GUI), a visual indicator 520 (e.g., a light emitting diode), and/or an audio transducer 525 (e.g., a speaker). In some aspects, the mobile computing device 500 incorporates a vibration transducer for providing the user with tactile feedback. In yet another aspect, the mobile computing device 500 incorporates input and/or output ports, such as an audio input (e.g., a microphone jack), an audio output (e.g., a headphone jack), and a video output (e.g., a HDMI port) for sending signals to or receiving signals from an external device.

FIG. 5B is a block diagram illustrating the architecture of one aspect of a mobile computing device. That is, the mobile computing device 500 can incorporate a system (e.g., an architecture) 502 to implement some aspects. In one embodiment, the system 502 is implemented as a "smart phone" capable of running one or more applications (e.g., browser, e-mail, calendaring, contact managers, messaging clients, games, and media clients/players). In some aspects, the system 502 is integrated as a computing device, such as an integrated personal digital assistant (PDA) and wireless phone.

One or more application programs 566 may be loaded into the memory 562 and run on or in association with the operating system 564. Examples of the application programs include phone dialer programs, e-mail programs, personal information management (PIM) programs, word processing programs, spreadsheet programs, Internet browser programs, messaging programs, and so forth. The system 502 also includes a non-volatile storage area 568 within the memory 562. The non-volatile storage area 568 may be used to store persistent information that should not be lost if the system 502 is powered down. The application programs 566 may use and store information in the non-volatile storage area 568, such as email or other messages used by an email application, and the like. A synchronization application (not shown) also resides on the system 502 and is programmed to interact with a corresponding synchronization application resident on a host computer to keep the information stored in the non-volatile storage area 568 synchronized with corresponding information stored at the host computer. As should be appreciated, other applications may be loaded into the memory 562 and run on the mobile computing device 500, including the instructions for implementing workflow policies as described herein (e.g., memory monitor, message manipulator, and/or packet generator, etc.).

The system 502 has a power supply 570, which may be implemented as one or more batteries. The power supply 570 may further include an external power source, such as an AC adapter or a powered docking cradle that supplements or recharges the batteries.

The system 502 may also include a radio interface layer 572 that performs the function of transmitting and receiving radio frequency communications. The radio interface layer 572 facilitates wireless connectivity between the system 502 and the "outside world," via a communications carrier or service provider. Transmissions to and from the radio interface layer 572 are conducted under control of the operating system 564. In other words, communications received by the radio interface layer 572 may be disseminated to the application programs 566 via the operating system 564, and vice versa.

The visual indicator 520 may be used to provide visual notifications, and/or an audio interface 574 may be used for producing audible notifications via an audio transducer 525 (e.g., audio transducer 525 illustrated in FIG. 5A). In the illustrated embodiment, the visual indicator 520 is a light emitting diode (LED) and the audio transducer 525 may be a speaker. These devices may be directly coupled to the power supply 570 so that when activated, they remain on for a duration dictated by the notification mechanism even though the processor 560, special-purpose processor 561, and other components might shut down for conserving battery power. The LED may be programmed to remain on indefinitely until the user takes action to indicate the powered-on status of the device. The audio interface 574 is used to provide audible signals to and receive audible signals from the user. For example, in addition to being coupled to the audio transducer 525, the audio interface 574 may also be coupled to a microphone to receive audible input, such as to facilitate a telephone conversation. In accordance with embodiments of the present disclosure, the microphone may also serve as an audio sensor to facilitate control of notifications, as will be described below. The system 502 may further include a video interface 576 that enables an operation of peripheral device 530 (e.g., on-board camera) to record still images, video stream, and the like.

A mobile computing device 500 implementing the system 502 may have additional features or functionality. For example, the mobile computing device 500 may also include additional data storage devices (removable and/or non-removable) such as, magnetic disks, optical disks, or tape. Such additional storage is illustrated in FIG. 5B by the non-volatile storage area 568.

Data/information generated or captured by the mobile computing device 500 and stored via the system 502 may be stored locally on the mobile computing device 500, as described above, or the data may be stored on any number of storage media that may be accessed by the device via the radio interface layer 572 or via a wired connection between the mobile computing device 500 and a separate computing device associated with the mobile computing device 500, for example, a server computer in a distributed computing network, such as the Internet. As should be appreciated such data/information may be accessed via the mobile computing device 500 via the radio interface layer 572 or via a distributed computing network. Similarly, such data/information may be readily transferred between computing devices for storage and use according to well-known data/information transfer and storage means, including electronic mail and collaborative data/information sharing systems.

As should be appreciated, FIGS. 5A and 5B are described for purposes of illustrating the present methods and systems and is not intended to limit the disclosure to a particular sequence of steps or a particular combination of hardware or software components.

The description and illustration of one or more aspects provided in this application are not intended to limit or restrict the scope of the disclosure as claimed in any way. The claimed disclosure should not be construed as being limited to any aspect, for example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

The present disclosure relates to systems and methods for dynamic re-routing of layer traffic in vRAN deployments according to at least the aspects provided in the sections below.

In an aspect, a server system supporting a radio access network (RAN) is provided. The server system includes a first message controller associated with a first RAN server and memory storing instructions that, when executed by a processor, cause the first message controller to perform a set of operations. The set of operations include intercepting a first message from a first layer one (PHY) of the first RAN server, where the first message is directed to a first layer two (L2) of the first RAN server over a first communication channel. Additionally, the operations include converting the first message into one or more first network packets, where converting the first message into the one or more first network packets comprises dropping state information of the first PHY associated with at least one slot. The set of operations further include re-routing the first message to a second layer two (L2) of a second RAN server by transmitting the one or more first network packets at a slot boundary via a network.

In an example of the server system, the communication channel is a shared-memory channel. In another example, the PHY processes data for a cell tower of the RAN and the first message comprises processed data associated with the cell tower. In a further example, the first message is received by a second message controller associated with the second RAN server, and the first message is placed in a second communication channel associated with the second L2 in the second RAN server. In yet another example, a second message is intercepted by the second message controller, where the second message is directed from the second L2 in the second RAN server to a second PHY in the second RAN server, the second message is converted by the second message controller into one or more second network packets, and the second message is re-routed by the second message controller to the first PHY of the first RAN server by transmitting the one or more second network packets via the network. In a further still example, the first and second messages are femtocell application programming interface (FAPI)-compliant messages. In another example, the first RAN server is different from the second RAN server.

In another aspect, a method of re-routing a message from a first RAN server to a second RAN server of a radio access network (RAN) is provided. The method includes, placing, by a PHY processor in the first RAN server, the message in a first memory of the first RAN server. The method further includes converting, by a first message controller in the first RAN server, the message in the first memory into one or more network packets, where converting the message into the one or more network packets comprises dropping state information of the PHY processor for at least one slot. Additionally, the method includes re-routing, by the first message controller, the one or more network packets to a second message controller in the second RAN server at a slot boundary via a network.

In an example of the method, the second message controller stores the message in a second memory of the second RAN server. In another example, a second L2 processor of the second RAN server accesses the message in the second memory. In a further example, the PHY processor is responsible for processing data for a cell tower of a radio access network (RAN) and the first message comprises processed data associated with the cell tower. In yet another example, the first memory is shared between the first PHY processor and a first L2 processor on the first RAN server. In a further still example, the second memory is shared between a second PHY processor and the second L2 processor on the second RAN server.

In yet another aspect, a method of re-routing a message from a first RAN server to a second RAN server of a radio access network (RAN) is provided. The method includes intercepting, by a first message controller in the first RAN server, the first message from a first layer one (PHY) in the first RAN server to a first layer two (L2) in the first RAN server over a communication channel. Additionally, the method includes converting, by the first message controller, the first message into one or more first network packets, where converting the first message into the one or more first network packets comprises dropping state information of the first PHY associated with at least one slot. The method further includes re-routing, by the first message controller, the first message to a second layer two (L2) of a second RAN server by transmitting the one or more first network packets at a slot boundary via a network.

In an example of the method, the communication channel is a shared-memory channel. In another example, the PHY processes data for a cell tower of the RAN, and wherein the first message comprises processed data associated with the cell tower. In a further example, the first message is received by a second message controller associated with the second RAN server, and the first message is placed in a second communication channel associated with the second L2 in the second RAN server. In yet another example, a second message is intercepted by the second message controller, where the second message is directed from the second L2 in the second RAN server to a second PHY in the second RAN server, the second message is converted by the second message controller into one or more second network packets, and the second message is re-routed by the second message controller to the first PHY of the first RAN server by transmitting the one or more second network packets via the network. In a further still example, the first and second messages are femtocell application programming interface (FAPI)-compliant messages. In another example, the first RAN server is different from the second RAN server.

Any of the one or more above aspects can be combined with any other of the one or more aspect as described herein.

What is claimed is:

1. A server system supporting a radio access network (RAN), comprising:
   a first message controller associated with a first RAN server; and
   memory storing instructions that, when executed by a processor, cause the first message controller to perform a set of operations, the set of operations comprising:
      intercepting a first message from a first layer one (PHY) of the first RAN server, wherein the first message is directed to a first layer two (L2) of the first RAN server over a first communication channel;
      converting the first message into one or more first network packets, wherein converting the first message into the one or more first network packets comprises dropping state information of the first layer one PHY associated with at least one slot; and
      re-routing the first message to a second layer two (L2) of a second RAN server by transmitting the one or more first network packets at a slot boundary via a network.

2. The server system of claim 1, wherein the first communication channel is a shared-memory channel.

3. The server system of claim 1, wherein the first layer one PHY processes data for a cell tower of the RAN, and wherein the first message comprises processed data associated with the cell tower.

4. The server system of claim 1, wherein:
   the first message is received by a second message controller associated with the second RAN server; and
   the first message is placed in a second communication channel associated with the second L2 in the second RAN server.

5. The server system of claim 4, wherein:
   a second message is intercepted by the second message controller, wherein the second message is directed from the second L2 in the second RAN server to a second PHY in the second RAN server;
   the second message is converted by the second message controller into one or more second network packets; and
   the second message is re-routed by the second message controller to the first layer one PHY of the first RAN server by transmitting the one or more second network packets via the network.

6. The server system of claim 5, wherein the first and second messages are femtocell application programming interface (FAPI)-compliant messages.

7. The server system of claim 1, wherein the first RAN server is different from the second RAN server.

8. A method of re-routing a message from a first RAN server to a second RAN server of a radio access network (RAN), comprising:
   placing, by a PHY processor in the first RAN server, the message in a first memory of the first RAN server;
   converting, by a first message controller in the first RAN server, the message in the first memory into one or more network packets, wherein converting the message into the one or more network packets comprises dropping state information of the PHY processor for at least one slot; and
   re-routing, by the first message controller, the one or more network packets to a second message controller in the second RAN server at a slot boundary via a network.

9. The method of claim 8, wherein the second message controller stores the message in a second memory of the second RAN server.

10. The method of claim 9, wherein a second L2 processor of the second RAN server accesses the message in the second memory.

11. The method of claim 8, wherein the PHY processor is responsible for processing data for a cell tower of a radio access network (RAN), and wherein the first message comprises processed data associated with the cell tower.

12. The method of claim 11, wherein the first memory is shared between the PHY processor and a first L2 processor on the first RAN server.

13. The method of claim 12, wherein the second memory is shared between a second PHY processor and the second L2 processor on the second RAN server.

14. A method of re-routing a message from a first RAN server to a second RAN server of a radio access network (RAN), comprising:
    intercepting, by a first message controller in the first RAN server, the first message from a first layer one (PHY) in the first RAN server to a first layer two (L2) in the first RAN server over a communication channel;
    converting, by the first message controller, the first message into one or more first network packets, wherein converting the first message into the one or more first network packets comprises dropping state information of the first layer one PHY associated with at least one slot; and
    re-routing, by the first message controller, the first message to a second layer two (L2) of a second RAN server by transmitting the one or more first network packets at a slot boundary via a network.

15. The method of claim 14, wherein the communication channel is a shared-memory channel.

16. The method of claim 14, wherein the first layer one PHY processes data for a cell tower of the RAN, and wherein the first message comprises processed data associated with the cell tower.

17. The method of claim 14, wherein:
    the first message is received by a second message controller associated with the second RAN server; and
    the first message is placed in a second communication channel associated with the second L2 in the second RAN server.

18. The method of claim 17, wherein:
    a second message is intercepted by the second message controller, wherein the second message is directed from the second L2 in the second RAN server to a second PHY in the second RAN server;
    the second message is converted by the second message controller into one or more second network packets; and
    the second message is re-routed by the second message controller to the first layer one PHY of the first RAN server by transmitting the one or more second network packets via the network.

19. The method of claim 18, wherein the first and second messages are femtocell application programming interface (FAPI)-compliant messages.

20. The method of claim 14, wherein the first RAN server is different from the second RAN server.

* * * * *